(12) United States Patent
Barry et al.

(10) Patent No.: US 10,151,205 B2
(45) Date of Patent: Dec. 11, 2018

(54) THERMAL SHIELDING IN A GAS TURBINE

(71) Applicant: ROLLS-ROYCE PLC, London (GB)

(72) Inventors: Matthew Barry, Derby (GB); Peter Burford, Derby (GB)

(73) Assignee: ROLLS-ROYCE plc, London (GB)

( * ) Notice: Subject to any disclaimer, the term of this patent is extended or adjusted under 35 U.S.C. 154(b) by 392 days.

(21) Appl. No.: 15/091,933

(22) Filed: Apr. 6, 2016

(65) Prior Publication Data

US 2016/0312621 A1 Oct. 27, 2016

(30) Foreign Application Priority Data

Apr. 21, 2015 (GB) .................................. 1506728.3
Jun. 24, 2015 (GB) .................................. 1511104.0

(51) Int. Cl.
*F01D 5/18* (2006.01)
*B23P 15/02* (2006.01)
*F01D 11/00* (2006.01)

(52) U.S. Cl.
CPC .............. *F01D 5/187* (2013.01); *B23P 15/02* (2013.01); *F01D 5/18* (2013.01); *F01D 5/188* (2013.01);
(Continued)

(58) Field of Classification Search
CPC . F01D 5/187; F01D 5/18; F01D 5/188; F01D 11/00; B23P 15/02; B23P 2700/06;
(Continued)

(56) References Cited

U.S. PATENT DOCUMENTS 5,177,954 A * 1/1993 Paul ........................ F01D 5/18
                                                        415/114
2006/0120855 A1 6/2006 Djeridane et al.
(Continued)

FOREIGN PATENT DOCUMENTS

DE       102004002327 A1    8/2005
EP             0340149 A1   11/1989
(Continued)

OTHER PUBLICATIONS

Sep. 19, 2016 Search Report issued in European Patent Application No. 16163837.
(Continued)

*Primary Examiner* — Logan Kraft
*Assistant Examiner* — Brian Delrue
(74) *Attorney, Agent, or Firm* — Oliff PLC

(57) ABSTRACT

A turbine blade has a body enclosing a labyrinth of internal channels for circulation of coolant received through an inlet integrally formed in terminal portion of blade root. The labyrinth includes; inlet arranged on an axially upstream face of terminal portion leading to an upstream duct portion having first section adjacent the inlet and a second section axially downstream of first, second section having reduced cross section compared to first section. Leading edge passage intersects first section and extends through blade body towards the tip. Main blade passage intersects second section. Trailing edge passage intersects downstream duct portion which is in axial alignment with but separate from second section and channel connects second section with the downstream duct portion. Channel has reduced cross section compared to second section and downstream duct portion. The inlet has an inverted keyhole shape with cross section extends through upstream duct portion first section.

17 Claims, 3 Drawing Sheets

(52) U.S. Cl.
CPC .......... *F01D 11/00* (2013.01); *B23P 2700/06* (2013.01); *F05D 2220/32* (2013.01); *F05D 2230/00* (2013.01); *F05D 2230/10* (2013.01); *F05D 2230/12* (2013.01); *F05D 2230/21* (2013.01); *F05D 2240/30* (2013.01); *F05D 2250/14* (2013.01); *F05D 2260/202* (2013.01)

(58) Field of Classification Search
CPC ............. F05D 2220/32; F05D 2230/00; F05D 2230/10; F05D 2230/12; F05D 2230/21; F05D 2240/30; F05D 2250/14; F05D 2260/202
USPC ........................................................ 416/96 R
See application file for complete search history.

(56) References Cited

U.S. PATENT DOCUMENTS

| | | |
|---|---|---|
| 2006/0292006 A1 | 12/2006 | Naik et al. |
| 2008/0181784 A1 | 7/2008 | Fokine et al. |
| 2014/0064984 A1* | 3/2014 | Zhang .................... F01D 5/187 |
| | | 416/97 R |
| 2015/0096306 A1* | 4/2015 | Sarangapani ........... F01D 5/187 |
| | | 60/806 |
| 2016/0146024 A1* | 5/2016 | Morris .................. F01D 5/3061 |
| | | 416/96 R |

FOREIGN PATENT DOCUMENTS

| | | |
|---|---|---|
| EP | 1577497 A1 | 9/2005 |
| GB | 1 514 613 A | 6/1978 |
| WO | 2005/068783 A1 | 7/2005 |
| WO | 2006/108764 A1 | 10/2006 |

OTHER PUBLICATIONS

Oct. 28, 2015 Search Report issued in British Patent Application No. 1506728.3.

Dec. 10, 2015 Search Report issued in British Patent Application No. 1511104.0.

\* cited by examiner

THERMAL SHIELDING IN A GAS TURBINE

TECHNICAL FIELD

The present disclosure concerns thermal shielding in a gas turbine, more particularly, thermal shielding of the bucket groove where a turbine blade root portion engages with the turbine disc. It also concerns control of internal cooling flows within the turbine blade such that increases of cooling flow in some internal cooling channels, does not reduce cooling flow to other internal channels/features in the turbine blade.

BACKGROUND OF THE INVENTION AND PRIOR ART

In a gas turbine engine, ambient air is drawn into a compressor section. Alternate rows of stationary and rotating aerofoil blades are arranged around a common axis; together these accelerate and compress the incoming air. A rotating shaft drives the rotating blades. Compressed air is delivered to a combustor section where it is mixed with fuel and ignited. Ignition causes rapid expansion of the fuel/air mix which is directed in part to propel a body carrying the engine and in another part to drive rotation of a series of turbines arranged downstream of the combustor. The turbines share rotor shafts in common with the rotating blades of the compressor and work, through the shaft, to drive rotation of the compressor blades.

It is well known that the operating efficiency of a gas turbine engine is improved by increasing the operating temperature. The ability to optimise efficiency through increased temperatures is restricted by changes in behaviour of materials used in the engine components at elevated temperatures which, amongst other things, can impact upon the mechanical strength of the blades and rotor disc which carries the blades. This problem is addressed by providing a flow of coolant through and/or over the turbine rotor disc and blades.

It is known to take off a portion of the air output from the compressor (which is not subjected to ignition in the combustor and so is relatively cooler) and feed this to surfaces in the turbine section which are likely to suffer damage from excessive heat. Typically the cooling air is delivered adjacent the rim of the turbine disc and directed to a port which enters the turbine blade body and is distributed through the blade, typically by means of a labyrinth of channels extending through the blade body.

In one known arrangement, a duct is provided integral to the blade root. The duct is arranged to pass through a terminal portion of the root with an inlet at an upstream face of the terminal portion and an end at or near the downstream face of the terminal portion. At its axially upstream face, the terminal portion is profiled to conform closely to the bucket groove profile and an inner wall defines the inlet which has a similar shape to the terminal portion at the upstream face. At its axially downstream end, the duct has a much smaller cross section, radially distanced from the bucket groove. An inner wall of the duct diverges from the downstream end of the duct to the inlet forming a continuous, inclined passage. One or more cooling passages are provided within the blade body and extend from a root portion towards a tip portion of the blade body.

In some arrangements the cooling passages comprise a leading edge passage and a main blade or "multi-pass" passage. The leading edge passage extends root to tip adjacent the leading edge of the blade. The "multi-pass" passage is an elongate and convoluted passage which typically incorporates multiple turns in three dimensions which extend the passage between the root and tip of the blade and from a middle section of the blade body, downstream to adjacent the trailing edge of the blade. The "multi-pass" can extend from root to tip multiple times as it travels towards the trailing edge ensuring the carriage of coolant throughout the blade body (excluding the leading edge which is cooled by the leading edge passage.). A trailing edge passage may optionally also be incorporated and may or may not be adjoined with a multi-pass. At the root end, the cooling passages are arranged to intersect with the duct.

SUMMARY OF THE INVENTION

According to a first aspect of the invention there is provided a turbine blade having a body enclosing a labyrinth of internal channels for the circulation of coolant received through an inlet integrally formed in a terminal portion of the blade root, the labyrinth comprising;
the inlet arranged on an axially upstream face of the terminal portion leading to an upstream duct portion having a first section adjacent the inlet and a second section axially downstream of the first, the second section having a reduced cross section compared to the first section;
a leading edge passage intersecting the first section and extending through the blade body towards the tip of the blade;
a main blade passage intersecting the second section;
a trailing edge passage intersecting with a downstream duct portion which is in axial alignment with but separate from the second section; and
a channel connecting the second section with the downstream duct portion, the channel having a reduced cross section compared to the second section and the downstream duct portion, wherein the inlet has an inverted key hole shape and the inverted key-hole cross section extends through the upstream duct portion first section.

In this context "terminal portion" is a region of the blade root which, in use, sits within a circumferentially positioned recess of a turbine disc.

Optionally, the channel is oval in cross section. The oval may be arranged with its major axis extending in a root to tip direction.

The upstream duct first and second sections may be distinguished by a step in the wall from the first section to the second section where the keyhole shaped section becomes a more axisymmetric cross section.

The leading edge passage sits adjacent a wall of the leading edge of the blade and serves to cool the leading edge wall when cooling air travels through the passage. Optionally, multiple holes are provided along or adjacent the leading edge, connecting with the leading edge passage for delivering a thin film of cooling air to an exposed surface of the leading edge.

The main blade passage can be a "multi-pass" which incorporates multiple turns in three dimensions which extend the passage between the root and tip of the blade and from a middle section of the blade body, downstream to adjacent the trailing edge of the blade. The "multi-pass" can extend from root to tip multiple times as it travels towards the trailing edge ensuring the carriage of coolant throughout the blade body (excluding the leading edge which is cooled by the leading edge passage.) Optionally, multiple holes are provided in the blade body, connecting with the main blade passage for delivering a thin film of cooling air to an exposed surface of the blade. For example, where the main blade passage is a "multi-pass" and extends towards the trailing edge of the blade, multiple holes may be provided adjacent the trailing edge of the blade. Cooling holes can be provided at other positions on the blade body and may extend in arrays running root to tip and/or arrays extending leading edge to trailing edge.

The trailing edge passage may adjoin the main-blade passage to form a multi-pass.

The intersection between the second section of the upstream duct portion and the main blade passage may be relatively narrow in cross section compared to the intersection of the leading edge passage with the first section. This ensures a predominant flow of coolant into the leading edge passage where it is most needed.

In one option, the geometry can be provided by casting a labyrinth of passages into the blade. In this case, a core is shaped to represent the profiles of the intersecting main blade passage, trailing edge passage, leading edge passage and downstream duct portions. The leading edge passage profile and main blade passage profile are joined by a forward breakout passage profile, the breakout passage profile having a smaller cross section than the upstream duct sections. Once the blade is cast and the core removed, the upstream duct is provided in a separate process. For example, the upstream duct may be machined into the cast blade. One suitable process for providing the upstream duct is plunge EDM machining. The core is configured and positioned to ensure an optimal wall thickness adjacent the bucket groove. Taking account of casting tolerances, the wall is cast to exceed or meet a minimum acceptable thickness. The post cast machining of the inlet enables the minimum wall thickness and an optimum inlet cross sectional area to be achieved in the completed blade.

The core may further include a rear breakout profile extending to a downstream edge of the blade thus providing a second exit route for the core once the blade is cast. Further breakout profiles may be provided at the tip end of the blade.

In a separate processing step, the breakout profiles near the tip and the rear breakout profile can be closed using any conventional closing technique. Closure of the breakouts better contains cooling air circulating through the leading edge passage, main blade passage and the downstream duct portion. For example, the orifice resulting from the rear breakout profile in the cast blade can be closed by a complementarily shaped plug, or joining (for example by welding) of a plate over the outlet after the core has been removed.

Optionally, the channel can be provided in the casting by appropriate core geometry. Optionally, the channel profile has a non-circular profile, for example an oval. Such a shape permits incremental increase in the cross section using a separate machining process should this prove desirable to optimise flow of coolant through the blade for a given operating condition.

In an alternative, the core geometry creates a wall between the upstream and downstream duct portions and the channel is created in another processing step, after the core has been removed from the cast blade. For example, the channel is provided by drilling through the downstream wall of the upstream duct second section through to the upstream wall of the downstream duct. The channel allows better control of the distribution of the available cooling air to the main blade passage ensuring flow is optimised to provide a cooling film at the blade surface. The size and/or geometry of the channel can be selected to suit blade end use requirements allowing the core geometry to be used for a variety of blades. The channel can be provided in axial alignment with the ducts but this is not essential. Optionally, the channel may be machined to incline towards the tip in an upstream to downstream direction to further encourage the delivery of air to the trailing edge passage.

As an alternative to machining the channel in a separate step to the provision of the upstream duct, plunge EDM machining can be used to provide both the upstream duct geometry and the channel in a single processing step. A suitable tool defines the geometry of the first and second portions of the upstream duct portion and the channel. The part of the tool defining the upstream duct portion has a larger cross section than the forward breakout passage provided in the casting step. This alternative permits greater versatility in the cross-section shape of the channel.

An advantage of providing two separate delivery routes for coolant to the main blade passage and the trailing edge passage in this manner is that the cross sections of the two can both be kept less than the cross sectional area of the upstream duct first section and its intersection with the leading edge passage. This achieves the main objective of providing a predominant coolant flow towards the leading edge passage whilst also making good use of coolant which might otherwise sit stagnant in the downstream duct portion.

The cross sectional shapes of the passages and ducts at their intersections can be contoured to reduce stress concentrations.

One purpose of the relatively large downstream duct portion is to remove mass from the blade and aid in improving turbine efficiency.

In another aspect, the invention provides a method for making a turbine blade having the novel internal geometry of a blade in accordance with embodiments of the first aspect of the invention, the method comprising;

providing a mould defining the external geometry of the blade, providing a core defining an internal geometry of the blade, the internal geometry comprising; an inlet arranged on an axially upstream face of a terminal portion of the blade root leading to a continuous duct terminating at a mid-blade region of the terminal portion; a leading edge passage intersecting the continuous duct portion and extending through the blade body towards the tip of the blade, a proximal end of the leading edge passage being angled, in use, towards the direction of incoming air flow; a main blade passage intersecting the continuous duct portion, a trailing edge passage intersecting with a downstream duct portion, the downstream duct portion arranged in axial alignment with the continuous duct portion, but separate therefrom and terminating at a downstream end in a core breakout passage;

casting a blade between the mould and core;

removing the blade from the mould and the core from the blade;

at the inlet on the axially upstream face, machining into the continuous duct portion an upstream duct portion, the upstream duct portion having a first section adjacent the inlet and a second section downstream of the first section intersection with the leading edge passage, the inlet and first section having a cross section which is an inverted key hole shape and the second section having a reduced cross sectional area compared to the first section.

Optionally, the core geometry further defines a channel of reduced cross-sectional area between the continuous duct portion and downstream duct portion. For example, the channel has an oval cross section.

Optionally, the machining step further involves machining a channel to connect the upstream and downstream duct portions. Optionally, the machining step can comprise a single operation. For example, the machining operation involves a plunge EDM method wherein the tool defines the profiles of the upstream duct portion and the channel. Optionally, the tool defines an oval shape for the channel.

The main blade passage can be a "multi-pass" which incorporates multiple turns in three dimensions which extend the passage between the root and tip of the blade and from a middle section of the blade body, downstream to adjacent the trailing edge of the blade. The "multi-pass" can extend from root to tip multiple times as it travels towards the trailing edge ensuring the carriage of coolant throughout the blade body (excluding the leading edge which is cooled by the leading edge passage.) The trailing edge passage may adjoin and form part of a multi-pass.

In a further optional step, the core breakout passage is closed, for example by a joining a plate to the downstream end of the passage.

In another optional additional step, the method includes machining a feed hole from a downstream face of the terminal portion which extends to intersect with the main blade passage.

Optionally, additional core breakouts may be provided. For example, one or more breakouts may be provided adjacent the tip of the blade cast. These breakouts can be closed using known closure techniques. Optionally, the breakouts may be partially closed, retaining small cooling holes in the breakouts The machining steps may be performed using a plunge EDM technique.

BRIEF DESCRIPTION OF THE DRAWINGS

Embodiments will now be described by way of example only, with reference to the Figures, in which.

DETAILED DESCRIPTION OF EMBODIMENTS OF THE INVENTION

Figure 1:
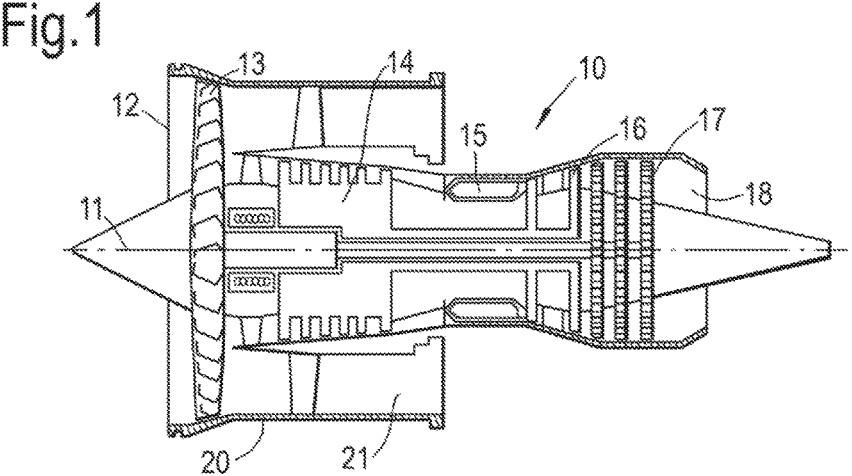
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, a high-pressure compressor 14, combustion equipment 15, a high-pressure turbine 16, a low-pressure turbine 17 and an exhaust nozzle 18. A nacelle 20 generally surrounds the engine 10 and defines the intake 12.

The gas turbine engine 10 works in the conventional manner so that air entering the intake 12 is accelerated by the fan 13 to produce two air flows: a first air flow into the high-pressure compressor 14 and a second air flow which passes through a bypass duct 21 to provide propulsive thrust. The high-pressure compressor 14 compresses the air flow directed into it before delivering that air to the combustion equipment 15.

In the combustion equipment 15 the air flow is mixed with fuel and the mixture combusted. The resultant hot combustion products then expand through, and thereby drive the high and low-pressure turbines 16, 17 before being exhausted through the nozzle 18 to provide additional propulsive thrust. The high 16 and low 17 pressure turbines drive respectively the high pressure compressor 14 and the fan 13, each by suitable interconnecting shaft.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan.

Figure 2:
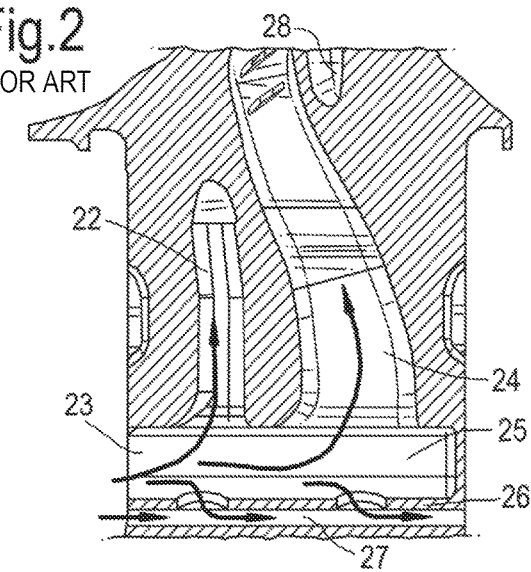
FIG. 2 is a cross section through the axis of a turbine blade incorporating a known labyrinth arrangement.

As can be seen in FIG. 2 a turbine blade root portion has an internal labyrinth of channels comprising a leading edge passage 22, a main blade passage 24 and a duct 25 with which each of the passages 22, 24 intersect. The duct has an inlet 23 at an axially upstream end. The duct is of substantially uniform and round cross section and is bounded by a thin wall 26 which closely matches the profile of a bucket groove 27 in a turbine disc (not shown). The wall incorporates orifices which permit a portion of the cooling air entering the duct to escape to the bucket groove 27, the majority of the cooling air being directed radially outward of the turbine disc into the leading edge and passage 22 and main blade passage 24. The main blade passage 24 is a multi-pass and includes a trailing edge passage section 28 which passes adjacent an inner wall adjacent the trailing edge of the blade.

Figure 3:
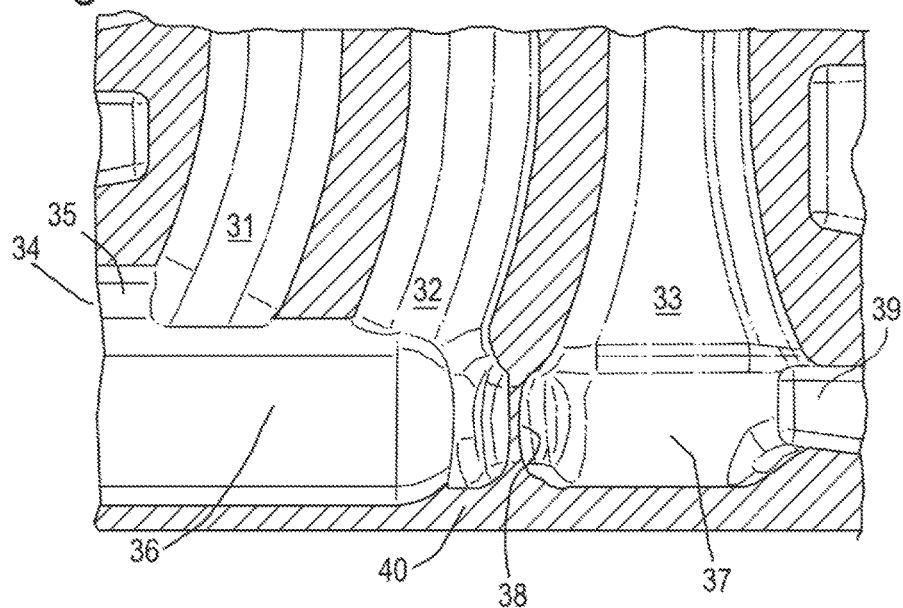
FIG. 3 is a cross section through the axis of a turbine blade incorporating a labyrinth arrangement in accordance with an embodiment of the invention.
Figure 4:
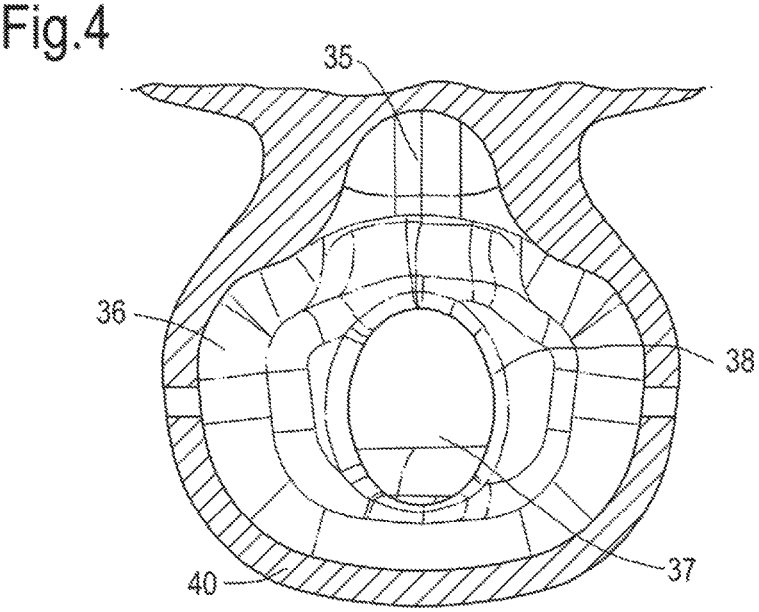
FIG. 4 is a cross section of the blade of FIG. 3 taken in a plane orthogonal to the axis.

FIGS. 3 and 4 show two sections through a root portion of an embodiment of a blade in accordance with the present invention. The sections are taken along an axis of the described duct and through a plane orthogonal to the axis. The internal geometry of the root portion comprises a leading edge passage 31, a main blade passage 32 and a trailing edge passage 33. A duct extends in an upstream to downstream direction of the blade and intersects with each of the passages 31, 32, 33. The duct has an inlet 34 at its upstream end. The inlet 34 has an inverted keyhole shape and extends to for a first section 35 of an upstream duct portion. The first section 35 meets the leading edge passage 31 at an upstream edge. The upstream duct portion steps down at a downstream edge of the leading edge passage 31 to form a second section 36 which has a reduced cross section compared to the first section 35 and is more axisymmetric in shape. The main blade passage 32 intersects the second section 36 of the upstream duct portion 35, 36 at a position axially downstream from the intersection with the leading edge passage 31. The trailing edge passage 33 intersects with a downstream duct portion 37. The downstream duct portion 37 has a substantially axisymmetric cross section which has a smaller area than that of upstream duct portion second section 36. Extending from a downstream end of the downstream duct portion 37 is a core breakout passage 39 which is optionally plugged or covered.

The upstream duct portion second section 36 and downstream duct portion 37 are connected by a relatively narrow channel 38 which is located just downstream of the intersection with the main blade passage 32 and just upstream of the intersection with the trailing edge passage 33. The cross sectional area of the channel 38 is smaller than that of either of the adjacent duct portions 36, 37. The duct is bounded by a duct wall 40.

The inverted keyhole shape of the inlet 35 is achieved by adding a radially extending channel to an existing more axisymmetric inlet design. This channel, in combination with the adjacent axisymmetric portion, defines the first section 35 of the upstream duct portion. The channel extends in a root to tip direction of the blade. The novel shape of the inlet 35 increases the height of the inlet and therefore the total cooling flow inlet area which could be achieved compared to a conventional round inlet. The height of the inverted keyhole shape is limited only by the maximum permissible radial height of a seal plate hole which interfaces with the blade and allows cooling air to enter the blade body. The ability to produce the first 35 and second 36 sections of the upstream duct portion using a single EDM plunge tool and a single machining operation enables machining cost for the blade to be minimized and avoids a machining mismatch which may result from machining sections 35 and 36 in separate operations.

The duct section downstream of the main blade passage 32 is conveniently defined in a casting process using a ceramic core to define the shape. The core is leached out at the end of the casting process. A reduced area of the inlet to the downstream duct portion 37 of the trailing edge passage is achieved by an appropriate narrowing of the core. Whilst a round core provides a channel 38 which is fit for the purpose of delivering cooling air to the downstream duct portion 37, a round core restriction shape has the disadvantage that it can result in die lines on the core which would have required hand dressing at the core manufacture stage. Due to the location of the die line within the duct, access is limited and the hand dressing difficult to achieve accurately. A possible consequence is malformation of the upstream duct portions in the finished part. An "oval" channel provides the flexibility to increase the channel diameter via EDM machining. Design layout showed that machining a round hole into an oval shaped restrictor would result in less variability than machining a round restrictor shape into a round restrictor shape that had been produced by core. In short, an oval shaped channel is less sensitive to the manufacturing processes.

Figure 5:
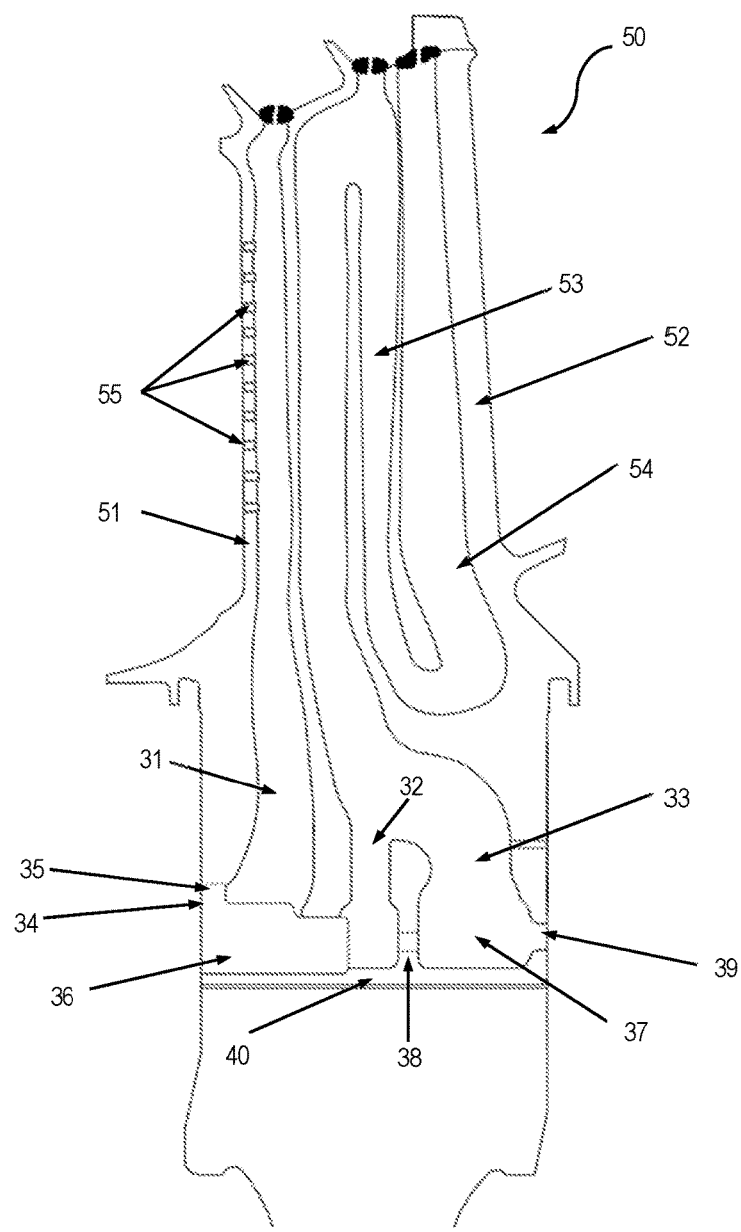
FIG. 5 is a cross-section illustrating the root portion of the embodiment of FIGS. 3 and 4.

FIG. 5 shows a blade 50 embodying the root portion described in FIGS. 3 and 4. The blade has a leading edge 51 and a trailing edge 52. As can be seen, the passages of the root portion form part of a multi-pass passage 53 which incorporates multiple turns in three dimensions which extend the passage between the root and tip of the blade and from a middle section of the blade body, downstream to adjacent the trailing edge 52 of the blade. A final stretch of the multi-pass forms a trailing edge passage 54. A plurality of film cooling holes 55 are provided along the leading edge, connecting with the leading edge passage for delivering a thin film of cooling air to an exposed surface of the leading edge 51.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A turbine blade having a body enclosing a labyrinth of internal channels for the circulation of coolant received through an inlet integrally formed in a terminal portion of the blade root, the labyrinth comprising;

the inlet arranged on an axially upstream face of the terminal portion leading to an upstream duct portion having a first section adjacent the inlet and a second section axially downstream of the first, the second section having a reduced cross section compared to the first section;

a leading edge passage intersecting the first section and extending through the blade body towards the tip of the blade;

a main blade passage intersecting the second section;

a trailing edge passage intersecting with a downstream duct portion which is in axial alignment with but separate from the second section and a channel connecting the second section with the downstream duct portion, the channel having a reduced cross section compared to the second section and the downstream duct portion, wherein the inlet has an inverted key hole shape and the inverted key-hole cross section extends through the upstream duct portion first section.

2. A turbine blade as claimed in claim 1 wherein the channel is oval in cross section.

3. A turbine blade as claimed in claim 1 wherein the upstream duct first and second sections are distinguished by a step in the wall from the first section to the second section where the keyhole shaped section becomes a more axisymmetric cross section.

4. A turbine blade as claimed in claim 1 wherein the leading edge passage sits adjacent a wall of the leading edge of the blade and serves to cool the leading edge wall when cooling air travels through the passage.

5. A turbine blade as claimed in claim 4 wherein multiple holes are provided along or adjacent the leading edge, connecting with the leading edge passage for delivering a thin film of cooling air to an exposed surface of the leading edge.

6. A turbine blade as claimed in claim 1 wherein the main blade passage is a "multi-pass" which incorporates multiple turns in three dimensions which extend the passage between the root and tip of the blade and from a middle section of the blade body, downstream to adjacent the trailing edge of the blade.

7. A turbine blade as claimed in claim 1 wherein the trailing edge passage is adjoined to the main blade passage.

8. A turbine blade as claimed in claim 1 wherein the trailing edge passage sits adjacent a wall of the trailing edge of the blade and serves to cool the trailing edge wall when cooling air travels through the passage.

9. A turbine blade as claimed in claim 8 wherein multiple holes are provided along or adjacent the trailing edge, connecting with the trailing edge passage for delivering a thin film of cooling air to an exposed surface of the trailing edge.

10. A gas turbine engine incorporating one or more turbine blades wherein the turbine blades have the configuration as set out in claim 1.

11. A method for making a turbine blade having the geometry of a blade according to claim 1, the method comprising;

providing a mould defining the external geometry of the blade, providing a core defining an internal geometry of the blade, the internal geometry comprising; an inlet arranged on an axially upstream face of a terminal portion of the blade root leading to a continuous duct terminating at a mid-blade region of the terminal portion; a leading edge passage intersecting the continuous duct portion and extending through the blade body towards the tip of the blade; a main blade passage intersecting the continuous duct portion, a trailing edge passage intersecting with a downstream duct portion, the downstream duct portion arranged in axial alignment with the continuous duct portion, but separate therefrom and terminating at a downstream end in a core breakout passage;

casting a blade between the mould and core;

removing the blade from the mould and the core from the blade;

at the inlet on the axially upstream face, machining into the continuous duct portion an upstream duct portion, the upstream duct portion having a first section adjacent the inlet and a second section downstream of the first section intersection with the leading edge passage, the inlet and first section having a cross section which is an inverted key hole shape and the second section having a reduced cross sectional area compared to the first section.

12. A method as claimed in claim 11 wherein the core further defines a channel connecting the continuous duct portion and the downstream duct portion.

13. A method as claimed in claim 12 wherein the portion of the core defining the channel is oval in cross section.

14. A method as claimed in claim 11 wherein, in a further step the core breakout passage is closed.

15. A core configured for use in the method of claim 11, the core defining an internal geometry of a blade, the internal geometry comprising; an inlet arranged on an axially upstream face of a terminal portion of the blade root leading to a continuous duct terminating at a mid-blade region of the terminal portion; a leading edge passage intersecting the continuous duct portion and extending through the blade body towards the tip of the blade; a main blade passage intersecting the continuous duct portion, a trailing edge passage intersecting with a downstream duct portion, the downstream duct portion arranged in axial alignment with the continuous duct portion, but separate therefrom and terminating at a downstream end in a core breakout passage.

16. A method as claimed in claim 1 wherein the machining step involves plunge EDM machining using a tool which defines the geometry of the inlet, the first section and the second section.

17. A method as claimed in claim 16 wherein the tool further defines the geometry of the channel.

* * * * *